(12) United States Patent
Rezaiifar et al.

(10) Patent No.: US 7,701,963 B2
(45) Date of Patent: Apr. 20, 2010

(54) METHOD AND APPARATUS FOR THE USE OF MICRO-TUNNELS IN A COMMUNICATIONS SYSTEM

(75) Inventors: Ramin Rezaiifar, San Diego, CA (US); Nikolai K. N. Leung, Takoma Park, MD (US); Paul E. Bender, San Diego, CA (US); Rajesh K. Pankaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1245 days.

(21) Appl. No.: 10/686,442

(22) Filed: Oct. 14, 2003

(65) Prior Publication Data

US 2004/0085951 A1 May 6, 2004

Related U.S. Application Data

(60) Provisional application No. 60/418,815, filed on Oct. 15, 2002.

(51) Int. Cl.
*H04J 3/22* (2006.01)
(52) U.S. Cl. .................. 370/446; 370/389; 370/351; 455/436
(58) Field of Classification Search .............. 370/409, 370/389, 395.53, 466, 351; 455/436, 127.1; 709/227
See application file for complete search history.

(56) References Cited

U.S. PATENT DOCUMENTS

| | | | | |
|---|---|---|---|---|
| 6,463,475 B1 * | 10/2002 | Calhoun | .................. | 709/227 |
| 6,501,957 B2 | 12/2002 | Muhonen et al. | | |
| 6,522,880 B1 * | 2/2003 | Verma et al. | .............. | 455/436 |
| 6,963,582 B1 * | 11/2005 | Xu | ............... | 370/466 |
| 7,072,336 B2 * | 7/2006 | Barany et al. | ............. | 370/389 |
| 7,173,932 B2 * | 2/2007 | Miki et al. | ................ | 370/389 |
| 7,313,371 B2 * | 12/2007 | Gibbs | .................. | 455/127.1 |
| 2004/0047336 A1 * | 3/2004 | Shabtay et al. | ............. | 370/351 |
| 2005/0227695 A1 * | 10/2005 | Rasanen et al. | ............ | 455/436 |
| 2006/0126644 A1 * | 6/2006 | Akahane et al. | ........ | 370/395.53 |

FOREIGN PATENT DOCUMENTS

EP 1096743 A1 5/2001

OTHER PUBLICATIONS

RFC 2983 "Differentiated Services and Tunnels", by D. Black, Network Working Group, Oct. 2000, http://www.ietf.org/rfc/rfc2983.txt, Section 4.1.*

Blake, S. et al., "An Architecture for Differentiated Services," RFC 2475, Dec. 1998.

(Continued)

*Primary Examiner*—Chi H Pham
*Assistant Examiner*—Albert T Chou
(74) *Attorney, Agent, or Firm*—Kristine U Ekwueme

(57) ABSTRACT

Micro-tunnels are used to provide multiple data service sessions to the same mobile node in a wireless communications system. Further, the flexibility of the micro-tunnels optimizes the resources of the system. On request for a data service, an encapsulation configuration record is generated. An encapsulation header is created in response to the encapsulation configuration. The encapsulation header includes a packet service identifier and a micro-tunnel identifier.

74 Claims, 3 Drawing Sheets

OTHER PUBLICATIONS

Gilligan, R. et al., "Transition Mechanisms for IPv6 Hosts and Routers," RFC 2893, Aug. 2000.

Hanks, S. et al., "Generic Routing Encapsulation (GRE)," RFC 1701, Oct. 1994.

Heinanen, J. et al., "Assured Forwarding PHB Group," RFC 2597, Jun. 1999.

Nichols, K. et al., "Definition of the Differentiated Services Field (DS Field) in the IPv4 and IPv6 Headers," RFC 2474, Dec. 1998.

Souvatzis, I., "Transmission of IPv6 Packets over ARCnet Networks," RFC 2497, Jan. 1999.

International Search Report, PCT/US03/032998. International Searching Authority, European Patent Office, Nov. 12, 2004.

International Preliminary Examination Report, PCT/US03/032998, International Preliminary Examining Authority, United States, Apr. 28, 2007.

G. Dommety, "Key and Sequence Number Extensions to GRE," IETF RFC 2890, Sep. 2000, pp. 1-7, Retrieved from the Internet: URL <http://www.ietf.org/rfc/rfc2890.txt>, The Internet Society, Reston, VA, USA XP002303410.

* cited by examiner

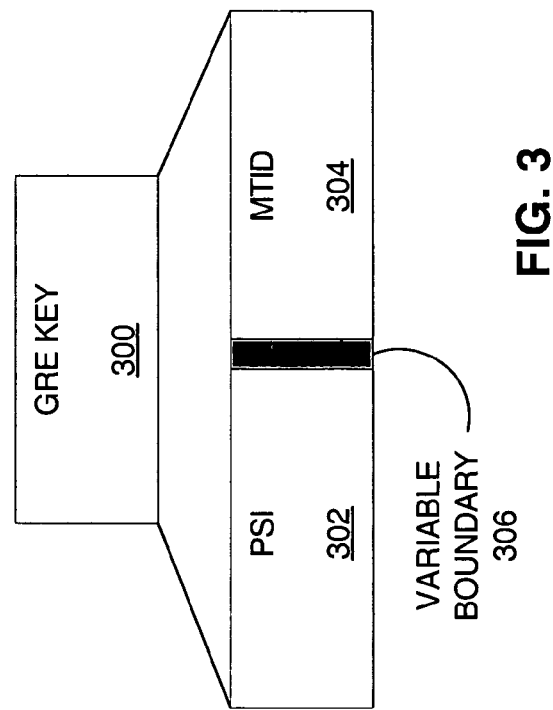
FIG. 2
FIG. 3

METHOD AND APPARATUS FOR THE USE OF MICRO-TUNNELS IN A COMMUNICATIONS SYSTEM

CLAIM OF PRIORITY UNDER 35 U.S.C. §119

The present Application for Patent claims priority to Provisional Application No. 60/418,815, entitled, "Micro-Tunnels," filed Oct. 15, 2002, and assigned to the assignee hereof and hereby expressly incorporated by reference herein.

BACKGROUND

1. Field

The present invention relates generally to data packet transmission and specifically to the use of micro-tunnels.

2. Background

Internet Protocol (IP) "tunnels" have become a widespread mechanism to transport data units, referred to as datagrams, over the Internet. Using Tunneling involves incorporating an original IP packet inside of another IP packet. Tunneling also has additional connotations about changing the effects of Internet routing on the original IP packet.

Typically, a tunnel is used to augment and modify the behavior of the deployed routing architecture, such as in multicast routing, mobile IP, and Virtual Private Network (VPN). From the perspective of traditional best-effort IP packet delivery, a tunnel behaves as any other link. Packets enter one end of the tunnel, and are delivered to the other end unless resource overload or error causes them to be lost.

Information may be encapsulated and routed through a tunnel. In the most general case, a system has a packet, which is referred to as a payload packet, which needs to be encapsulated and routed. The payload packet is first encapsulated in a Generic Routing Encapsulation (GRE) packet, which possibly also includes a routing. The resulting GRE packet may then be encapsulated in some other protocol and then forwarded. This outer protocol is referred to as the delivery protocol.

For mobile IP, a wireless system interfaces with an IP network. Tunnels are used for transporting data from the IP network to infrastructure elements in the wireless system. The data may involve multiple streams of data for transmission to and/or from a same mobile node. In this case, the system must establish individual tunnels for each stream.

In mobile IP the home agent associated with the mobile node redirects packets from the home network to the care-of address by constructing a new IP header containing the mobile node's care-of address as the destination IP address. The home agent is a router on a mobile node's home network maintaining information about the device's current location, as identified in its care-of address. The care-of address is a temporary IP address for a mobile node enabling message delivery when the device is connecting from somewhere other than its home network. The care-of address identifies a mobile node's current point of attachment to the Internet and makes it possible to connect from a different location without changing the device's home address (permanent IP address). The new header then shields or encapsulates the original packet, causing the mobile node's home address to have no effect on the encapsulated packet's routing until it arrives at the care-of address. Such encapsulation is also called tunneling, which suggests the packet burrows through the Internet, bypassing the usual effects of IP routing.

In a mobile IP environment, there is a need to identify multiple tunnels each associated with a same mobile node. Further, there is a need for flexible tunnel set up which optimizes the resources of the system.

BRIEF DESCRIPTION OF THE DRAWINGS

FIG. 2 is a Generic Routing Encapsulation (GRE) format.

FIG. 3 is a GRE key format.

DETAILED DESCRIPTION

The field of wireless communications has many applications including, e.g., cordless telephones, paging, wireless local loops, Personal Digital Assistants (PDAs), Internet telephony, and satellite communication systems. A particularly important application is cellular telephone systems for mobile subscribers. As used herein, the term "cellular" system encompasses both cellular and Personal Communication Services (PCS) frequencies. Various over-the-air interfaces have been developed for such cellular telephone systems including, e.g., Frequency Division Multiple Access (FDMA), Time Division Multiple Access (TDMA), and Code Division Multiple Access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ Generation Partnership Project "3GPP," Document Nos. 3G TS 25.211, 3G TS 25.212, 3G TS 25.213, and 3G TS 25.214.

Figure 1:
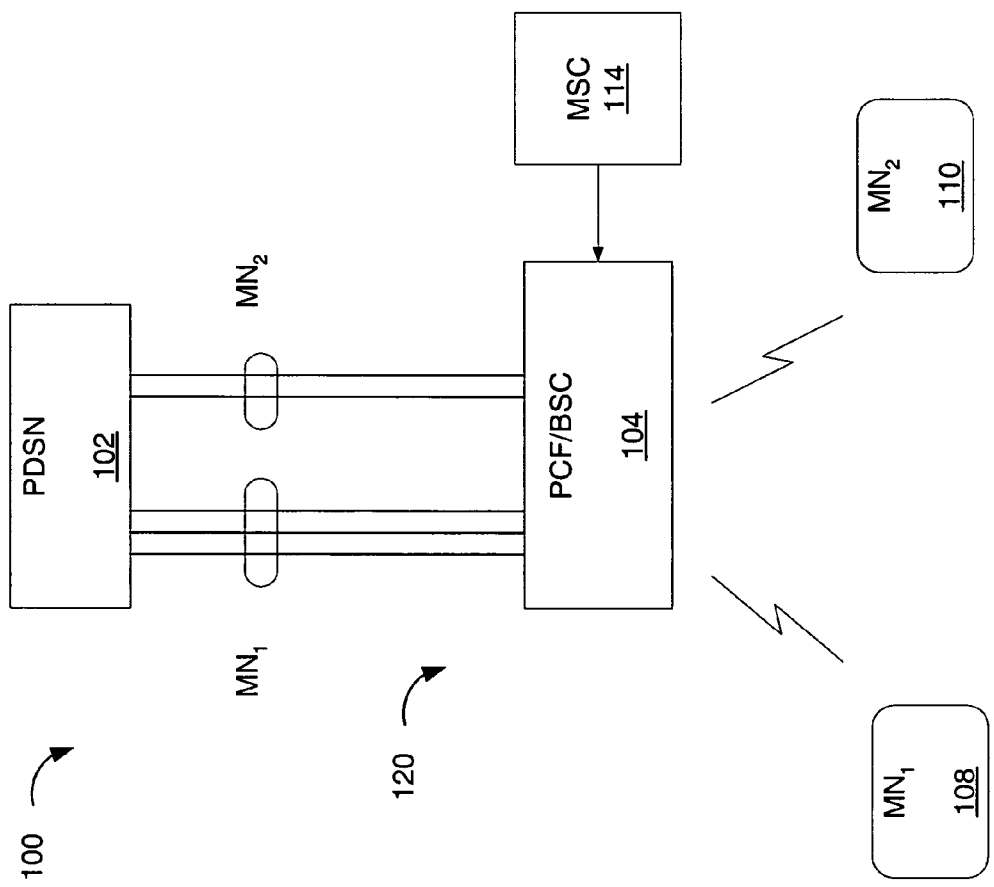
FIG. 1 is a wireless communication system supporting mobile IP.

A cellular communication system supporting mobile IP is illustrated in FIG. 1.

System 100 supports communications of packets of data, wherein a packet is a logical grouping of information including a header containing control information and user data. Packets most often are used to refer to network layer units of data. Note the terms datagram, frame, message, and segment also are used to describe logical information groupings at various layers of the Open Systems Interconnection (OSI) reference model.

In the system 100, a Packet Data Service Node (PDSN) 102 interfaces between the wireless communication system and an IP network. In the mobile IP environment, the PDSN may also be referred to as a Foreign Agent (FA). The Home Agent (HA) is the node in the home network of the mobile node effectively causing the mobile node to be reachable at a home address even when the mobile node is not attached to the home network.

Continuing with FIG. 1, the PDSN 102 communicates with the various Mobile Nodes (MNs) via a Packet Control Function/Base Station Controller (PCF/BSC) 104.

Note the PCF and BSC may reside in separate infrastructure elements or may be combined in one element as illustrated in FIG. 1. The PDSN 102 provides communications for MN 108, 110 via the PCF/BSC 104. A Mobile Switching Center (MSC) is also in communication with PCF/BSC 104.

For a typical packet data communication, the PCF/BSC 104 sends an A11-Registration Request message to the PDSN 102 to establish an A10/11 interface between itself and the PDSN. The various interfaces refer to the communication links or sessions between the infrastructure elements. The A11 interface is generally identified as the link between the PDSN 102 and the PCF/BSC 104.

The PCF/BSC 104 binds the mobile station identifier, e.g. a Mobile Identification Number (MIN) such as an International Mobile Subscriber Identity (IMSI), to a Packet Session Identifier (PSI) unique within the PCF/BSC 104. The IMSI is a number used to uniquely identify personal mobile stations (i.e., mobile nodes). In some cases, ambiguity might arise when using only the 10-digit MIN. In one system, the first three (most significant) decimal numbers of the IMSI are the Mobile Country Code (MCC); the remaining digits are the National Mobile Station Identity (NMSI).

For each data communication to MN 108 or MN 110, the PCF/BSC 104 establishes a separate link. When the PCF/BSC 104 establishes the link, the PCF/BSC 104 includes the PSI in the A11-Registration-Request message that is sent to the PDSN. In this way, a communication intended for a given MN, such as MN 108 or MN 110, is processed via the designated link. As the number of data services increases, a MN may desire to have multiple data communications concurrently. In this case, the PCF/BSC 104 seeks to establish a link for each communication.

As described herein "micro-tunnels" are logical connections between the PDSN 102 and the PCF/BSC 104 that are identified by a source IP address and a destination IP address. For example, the source IP address may be identified as "src_ip_address," and the destination IP address may be identified as "dest_ip_address." A micro-tunnel is then designated by the following:

<src_ip_address=PDSN_IP, dest_ip_address=PCF_IP, GRE_key>.

In this context, the source refers to the PDSN 102, the destination refers to the PCF/BSC 104. Note, micro-tunnels are independent of the air-interface service instances (i.e., no one-to-one mapping is assumed between the micro-tunnels and the air-interface service instances).

Each micro-tunnel is assigned a separate communication for a given MN. As illustrated in FIG. 1, multiple micro-tunnels may be established for one MN. In the example of FIG. 1, three micro-tunnels are established for three separate communications to MN 108, while two micro-tunnels are established for two separate communications to MN 110. However, a single communication may utilize one or more micro-tunnels. The micro-tunnels are established when the PCF/BSC 104 sends a message to the PDSN 102. Specifically, the message is an A11-Registration-Request.

Once a micro-tunnel is established, a communication may be transmitted via the established micro-tunnel. There is not necessarily a one-to-one mapping between the air-interface service instances and micro-tunnels.

The micro-tunnel serves the following purposes:
  Identify the PPP context;
  Identify the IP context; and
  Differentiate services.

The following discussion details each of these micro-tunnel functions.

PPP Context:

The micro-tunnels are used by the PDSN 102 to indicate to the Radio Access Network (RAN) 120 whether the data packets carried by the micro-tunnel may be dropped or not. In lieu of such indication, the RAN 120 may decide to drop packets if they get too stale. For example, if stateful compression or encryption is used, dropping packets in the RAN 120 may cause problems for de-compression. State is a collection of information maintained by an entity. Stateful encryption or compression means the encryptor/decryptor or the compressor/decompressor maintains state information. Dropped packets therefore will impact the compressor/decompressor processes. In such a case, the PDSN 102 selects a "do not drop" attribute for the micro-tunnel.

The micro-tunnels are further used by the PDSN 102 to indicate those packets transported via a given micro-tunnel are to be treated differently from the other packets transported via another micro-tunnel. For example, the PDSN 102 may indicate packets carried by a first micro-tunnel have a particular header compression, such as zero-byte-header compression. The PCF/BSC 104 then interprets this information and uses a Radio Link Protocol (RLP)-free service instance to carry these packets.

IP Context:

Using micro-tunnels the PDSN 102 indicates to the RAN 120 that re-ordering of data packets is allowed across micro-tunnels but not within the micro-tunnels. This approach is consistent with recommendations in section 4.1 of "Differentiated Services and Tunnels" by D. Black, published October 2000, and identified as RFC 2983 by the Internet Engineering Task Force (IETF). In some situations, it may be desirable to enable reordering among packets in different micro-tunnels to coexist with an absence of packet reordering within each individual micro-tunnel.

In a first scenario, a node supporting various quality of service requirements and discriminate among packets, such as a Differentiated Services (DS) node, is instructed not to re-order packets belonging to the same micro-flow and the same quality of service requirements, such as an Assured Forwarding (AF) class. Note, DS and AF classes are defined in: (1) "Assured Forwarding PHB Group" by J. Heinanen et al., published June 1999 and identified as RFC 2597; (2) "Definition of the Differentiated Services Field (DS Field) in the IPv4 and IPv6 Headers" by K. Nichols, published December 1998, and identified as RFC 2474; and (3) "An Architecture for Differentiated Services" by S. Blake, published December 1998, and identified as RFC 2475. Each of the RFC documents referenced herein is provided by the Network Working Group of the Internet Engineering Task Force (IETF).

Differentiated Services (DS) are intended to provide a framework and building blocks to enable deployment of scalable service discrimination in the Internet. The differentiated services approach aims to speed deployment by separating the architecture into two major components, one of which is fairly well-understood and the other of which is just beginning to be understood. Packet forwarding is a task which is performed on a per-packet basis as quickly as possible. Forwarding uses the packet header to find an entry in a routing table specifying the packet's output interface. Routing sets the entries in the table and may need to reflect a range of transit and other policies as well as to keep track of route failures. Routing tables are maintained as a background process to the forwarding task. A Differentiated Services Domain is a contiguous portion of the Internet over which a consistent set of differentiated services policies are administered in a coordinated fashion. A differentiated services domain may represent different administrative domains or autonomous systems, different trust regions, different network technologies (e.g., cell/frame), hosts and routers, etc.

Alternate embodiments may apply alternate methods whereby packets are discriminated among and unique treatment applied thereto. Alternate services also provide quality of service variations to different data packets.

Assured Forwarding of IP packets over the Internet is desirable, for example, when a company uses the Internet to interconnect to geographically distributed sites and wants an assurance that IP packets within this intranet are forwarded with high probability. In this situation, it is desirable for the network to not reorder packets belonging to the same microflow, wherein a microflow: is a single instance of an application-to-application flow of packets which is identified by source address, destination address, protocol id, and source port, destination port (where applicable).

Assured Forwarding (AF) grouping provides a means for a provider DS domain to offer different levels of forwarding assurances for IP packets received from a customer DS domain. Four AF classes are defined, wherein each AF class is, in each DS node, allocated a certain amount of forwarding resources, such as buffer space and bandwidth. IP packets wishing to use the services provided by the AF group are assigned by the customer or the provider DS domain into one or more of these AF classes according to the services to which the customer has subscribed.

Within each AF class, IP packets are marked with one of three possible drop precedence values. In case of congestion, the drop precedence of a packet determines the relative importance of the packet within the AF class. A congested DS node tries to protect packets with a lower drop precedence value from being lost by preferably discarding packets with a higher drop precedence value.

In a DS node, the level of forwarding assurance of an IP packet thus depends on: (1) the amount of forwarding resources allocated to the AF class to which the packet belongs, (2) the current load of the AF class, and, in case of congestion within the class, (3) the drop precedence of the packet.

For example, if traffic conditioning actions at the ingress of the provider DS domain make sure an AF class in the DS nodes is only moderately loaded by packets with the lowest drop precedence value and is not overloaded by packets with the two lowest drop precedence values, then the AF class may offer a high level of forwarding assurance.

In another embodiment, the Assured Forwarding (AF) group provides forwarding of IP packets in N independent AF classes. Within each AF class, an IP packet is assigned one of M different levels of drop precedence. An IP packet belonging to an AF class i and has drop precedence j is marked with the AF codepoint AFij, where $1<=i<=N$ and $1<=j<=M$. Currently, four classes (N=4) with three levels of drop precedence in each class (M=3) are defined for general use. More AF classes or levels of drop precedence may be defined for local use.

The identity of the micro-flow is hidden (due to GRE encapsulation) on the R-P interface between the RAN and the PDSN. Therefore, the DS nodes between the PDSN and RAN cannot distinguish different micro-flows from each other unless the PDSN uses a micro-tunnel for each micro-flow in order to satisfy the in-sequence delivery requirement. Another example of the flows which are sensitive to re-ordering is flows protected by IPsec.

The GRE format is illustrated in FIG. 2. The data packet format includes a delivery header 202, a GRE header 204 and a payload packet 206. The GRE header 204 may include a key field containing a four octet number which was inserted by the encapsulator. The key may be used by the receiver to authenticate the source of the packet. In one embodiment, the key field is made up of two fields. Also, the GRE header 204 may include a sequence number field. The sequence number field contains an unsigned 32 bit integer which is inserted by an encapsulator. It may be used by the receiver to establish the order in which packets have been transmitted from the encapsulator to the receiver.

In another scenario, certain packets, such as Layer 2 Tunneling Protocol (L2TP) packets and IPsec packets, should not be re-ordered. By using a separate micro-tunnel for these types of traffic, the PDSN 102 instructs the PCF/BSC 104 that re-ordering is allowed among the IPsec/L2TP traffic, but not within a micro-tunnel. Note, L2TP is an industry-standard Internet tunneling protocol. Unlike Point-to-Point Tunneling Protocol (PPTP), L2TP does not require IP connectivity between the client workstation and the server. L2TP requires only that the tunnel medium provide packet-oriented point-to-point connectivity. The protocol may be used over media such as ATM, Frame Relay, and X.25. L2TP provides the same functionality as PPTP. Based on Layer 2 Forwarding (L2F) and PPTP specifications, L2TP allows clients to set up tunnels across intervening networks.

In another aspect, for different micro-tunnels, the sequence space for the sequence field of the GRE header 204 is different. If all the micro-tunnels share the same sequence space, then the R-P interface may not able to take advantage of treating the Differentiated Services Code Point (DSCP) marking differently. DSCP is used for implemented Quality of Service (QoS). A replacement header field, called the DS field, includes six bits of as a DSCP codepoint, to select the per-hop-behavior a packet experiences at each node. The DSCP is detailed in RFC 2474, described hereinabove.

The receiver would re-order the packets based on the GRE sequence number and any gain which could have been achieved by the R-P interface giving packets with certain code-point a higher priority would be lost. If different micro-tunnels do not share the same sequence space, the PDSN may use a different micro-tunnel for sending packets with different DSCP.

Service differentiation for the traffic carried by each micro-tunnel is independent of the micro-tunnel ID and is based on the outer DSCP or other signaling information exchanged between the PDSN and RAN (e.g., RSVP).

Format of the GRE key field:

FIG. 3 illustrates the GRE key field 300 of the GRE header 204 according to one embodiment, wherein the GRE key field 300 includes two fields: Packet Service Identifier (PSI) 302; and Micro-Tunnel Identifier (MTID) 304. The boundary 306 between the two fields is not fixed, and therefore is illustrated to indicate the boundary may be adjusted or determined by the PCF/BSC 104 or the PDSN 102. The GRE key field 300 is used by the PDSN 102 to identify the micro-tunnel for a given user by the MTID, as well as identifying the associated MN by the PSI.

To build the GRE key field 300, the PCF/BSC 104 receives a request for a data service from a MN, such as MN 108. The PCF/BSC 104 requests the establishment of a link for servicing the data service for MN 108. The PCF/BSC 108 sends a GRE key configuration record to the PDSN 104. The GRE key configuration record may be provided in the form <PSI, L>, wherein L indicates the length of the MTID field 304.

For example, for if the record is given as <00,2>, the PSI is identified by digital value 00 and the last two bits are available for identifying the MTID. Each value of the GRE key field in the GRE tunnel between the PDSN 102 and the PCF/BSC 104 identifies a micro-tunnel. For the PSI field determination, the PCF/BSC 104 structures a list of <network address, subnet mask>pairs from which the PCF chooses to associate a mobile node.

Figure 4:
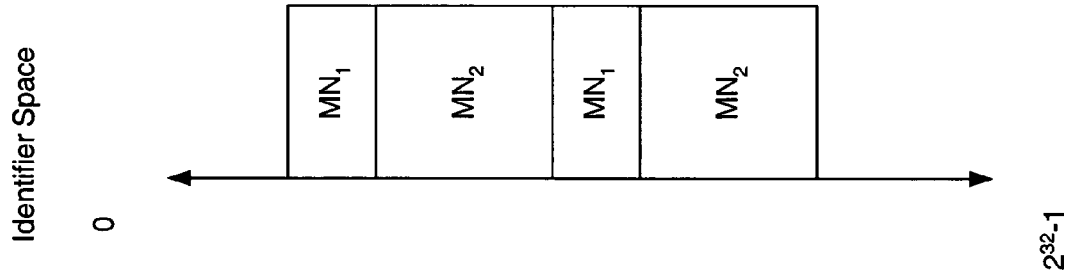
FIG. 4 is an illustration of the GRE key space.

A general scheme for constructing the GRE key field 300 allows the PCF to determine the available PSI values for a given mobile node. In other words, the PCF determines the GRE key configuration record. In one embodiment, the GRE key field 300 is specified as having a fixed number of bits, i.e., a fixed length. For example, the GRE key field 300 may be specified as 32 bits defining a GRE key space as illustrated in FIG. 4. Each value in the GRE key space is identified by four bits. The GRE key field 300 is used to identify both the PSI field 302 and the MTID field 304 as illustrated in FIG. 3. Therefore, if two bits are used to identify the MN, i.e., the destination identifier PSI, there are two bits left to identify the micro-tunnel, i.e., for the micro-tunnel identifier MTID. In this way, the PCF is able to allocate the total available values in the GRE key space to multiple mobile nodes.

As an example, the PCF may assign the two MSB bits 00 to MN 108. The configuration record would be <00,2>indicating that 2 bits remain for micro-tunnel identifiers, i.e., MTID. The corresponding to GRE key values available for MN 108 are then 0000, 0001, 0010, and 0011. The MN 108 would have 4 available identifiers for micro-tunnels. The PCF may then assign the three MSB bits 010 to MN 110, wherein the configuration record would be <010,1>indicating there is one bit left for the MTID. In this case, MN 110 would have 2 identifiers available for micro-tunnels. The resultant GRE key values available for MN 110 would be 0100, 0101. In other words, the boundary 306 between the PSI field 302 and the MTID field 304 is variable per mobile node. The ability to craft the PSI and MTID fields 302, 304 available for different mobile nodes may result in a GRE key space which is fragmented. The fragmentation provides flexibility in resource allocation within the system. As described hereinabove, the PCF determines the assignments within the GRE key space and provides this information to the PDSN in the form of a configuration record.

It is desirable to allocate the available identifiers for multiple mobile nodes, and therefore, the PCF determines a range of values for each mobile node. Such determination may be based on historical usage of mobile nodes, available services, or some other design criteria specific to the system. While the GRE key field 300 is specified as a fixed length, the PSI and MTID fields 302, 304 have variable length, as indicated by the variable boundary 306. The longer the PSI field 302, i.e., more bits allocated to PSI, the more mobile nodes may be identified, as the PSI is used to identify the mobile node. The longer PSI fields, however, leave fewer bits for the MTID, which identifies each of the micro-tunnels for a given mobile node, and therefore, the fewer micro-tunnels available per mobile node. Similarly, shorter PSI fields allow fewer MNs, but allow more micro-tunnels per MN.

Note, alternate embodiments may utilize an alternate field having a different number of bits than the GRE key field 300. Still other embodiments may implement a field having a variable number of bits, the PSI and MTID fields 302, 304 are then allocated within the variable length field. In these latter embodiments, the PSI and MTID length allocation may be determined proportionally, or may be specifically determined given the current length of the variable length field.

When the PDSN 102 receives traffic destined for the PPP instance associated with a particular mobile node, the PDSN 102 encapsulates the traffic in a GRE tunnel and sets the GRE key field 300 as described herein. The PDSN 102 sets the Most Significant Bits (MSBs) of the GRE key field 300 (i.e., PSI field 302) to the one of the network addresses which the PCF/BSC 104 has advertised in the A11-Registration-Request message for a particular MN, wherein each PPP instance is associated with an IMSI. The length of the network address is determined by the subnet mask associated with the network address used.

The PDSN 102 sets the LSBs of the GRE key field 300 (i.e., MTID field 304) to identify the micro-tunnel in which the packet should be carried. The numerical value of the LSBs has no significance and is only used to identify a micro-tunnel.

The PCF/BSC 104 routes packets received via micro-tunnels to the mobile stations by examining the GRE key field 300 of the GRE header 204 and determining the associated mobile station ID based on the "routing tables" advertised to the PDSN in the A11-Registration-Request message. In one case, the PCF/BSC 102 may specify the MSBs of the GRE key field 300 and allow the PDSN 104 to specify the LSBs of the GRE key field 300.

In order to make the A11-Registration Message backwards compatible, the PCF/BSC 104 may populate the PSI field in the A11-Registration Request with the PSI field which is left-justified and append the length of the PSI field as a new information element to the A11-Registration Request message.

An alternative method of specifying the GRE Key associated with micro-tunnels is where the BSC/PCF sends to the PDSN (in an A11-Registration Request message) the entire 32-bits of the GRE Key for the micro-tunnel along with the QoS characteristics of the micro-tunnel to be established.

The PDSN 102 is the entity to drop packets if congestion occurs at the RAN 120, which is where a bottleneck may be expected. Note that the PDSN 102 is the entity which may drop a whole IP packet without the need to remove the link layer framing (the BSC gets the packets when HDLC is already applied to them). Also, the PDSN 102 distinguishes a PPP control packet from a PPP frame containing data (again the PCF/BSC 102 has to peek into the packet in order to make this distinction). The RAN is where the queues associated with packets with different QoS requirements are formed.

Because of the above facts, the PCF/BSC 104 may be the entity which provides back-pressure to the PDSN 102. The PCF/BSC 104 should apply back-pressure based on the DS code points. The idea is that the length of the PCF/BSC 104 queues for different DSCPs may be different because the PCF/BSC services the bins for different DSCPs differently. More precisely, the PCF should be able to apply back-pressure by specifying <PSI, DSCP, MTID> triplet. The mobile should be able to set any of the PSI, DSCP, or MTID to a wild-card value. For example, a <PSI, *, *> indicates a back-pressure for all the traffic destined for the mobile identified by the PSI.

The current A-interface signaling maps each air interface service instance identified by an sr_id to a GRE tunnel identified by <src_ip=PDSN_IP, dest_ip=PCF_IP, GRE_key=PSI>. It is also expected for the PDSN to map the received packets from the Internet side to an appropriate air-interface pipe which is identified by the sr_id. In the method, the following assumptions are made: (1) the air-interface pipes (aka service instances) with appropriate QoS characteristics are assumed to be established prior to reception of the IP packets; (2) the PDSN is assumed to be aware of the QoS characteristics of these service instances.

The first assumption is wasteful as there may be no packets received at the PDSN for the microflow. Also, the number of possible configurations of the air-interface streams may be well above the maximum number of simultaneous streams which the air-interface may support. Therefore, it may not be possible or desirable to pre-establish air-interface streams with all the possible configurations and expect the PDSN to map the flows to the air-interfaces streams. The second assumption requires a new set of signaling to transfer information (i.e., characteristics of the air-interface streams) from the Radio Access Network (RAN) to the PDSN. This may be avoided when the mapping of the micro-flows to air-interface streams is performed at the RAN.

The RAN has access to two pieces of information used to create air-interface pipes with the required characteristics and route the received packets from the PDSN to these air-interface pipes: a) The RAN knows what type of service instance are to be created based on the QoS characteristics of the packet given by the PDSN; and b) The RAN knows the characteristics of the service instances.

Another consideration is authorization. The RAN, rather than the PDSN, is typically the entity providing the air-interface QoS as a service to the user. Therefore, it is reasonable to assume the RAN is responsible for authorizing the user to receive QoS as a service or not based on a user's RAN subscription. Additionally, it is desirable for the RAN to be the entity which decides whether a new service instance will be created to differentiate between handling of packets.

The PDSN receives packets from different subnets on the Internet side. The PDSN may have a different Service Level Agreements (SLA) with these subnets. These SLAs enable the PDSN to understand how each packet is to be treated depending on the DSCP value. The BSC only understand a certain mapping between the DSCP and Per-Hop Behavior (PHB) which is given to it by the PDSN. Therefore, the PDSN should translate (i.e., re-map) the received DSCPs into codepoint values which are understood by the BSC. This is a functionality expected from any other edge-router in the DS frame-work.

In another embodiment the mobile knows the QoS requirements associated with a particular micro-flow. The mobile tells the BSC/RAN the requested QoS requirements and the GRE key associated with this QoS treatment. The RAN then determines whether the mobile is authorized to receive this treatment. The RAN may verify authorization by checking with an Accounting, Authentication, and Authorization (AAA) server to determine the client's authorization based on a subscription. Alternately, the RAN may make this determination based on load. The RAN may then choose to establish an air-interface service instance (e.g., an RLP instance) which is appropriate for the QoS treatment requested (e.g., no RLP re-transmission for delay-sensitive QoS requirement). The RAN then requests establishment of the A10/A1 interfaces which is going to carry this microflow. The MS then conveys to the PDSN the required QoS characteristics and the information which specifies the micro-flow (e.g., the source IP address, destination EP address, protocol, and the port number).

In yet another embodiment, if the PDSN knows a certain micro-flow requires a particular QoS treatment, that information is conveyed either directly through the IP pipe between PDSN and the mobile, or through the A-interface and then the air-interface signaling. The rest of the scenario then becomes similar to the scenario in which the mobile is the entity aware of the QoS requirements for the micro-flow. The PDSN may become the entity aware of the QoS requirements for a micro-flow based on the SLA as described hereinabove.

New A-interface messaging is needed for the PDSN to identify to the BSC the characteristics associated with packets carried by certain micro-tunnels. For example, the PDSN indicates to the PCF that packets carried by micro-tunnel <PSI, MTID> are zero-byte header compressed. The BSC uses this information to carry these packets on the air-interface using an "RLP-free" service instance. In particular, the PDSN should be able to associate the following attributes to each micro tunnel:

Dropping is permitted or not within this micro-tunnel. This is a key Quality of Service criterion.

Link-Layer Assisted ROHC (LLAROHC) (zero-byte header compression) application. This information is needed by the BSC for routing the packets received from the PDSN to the service instance negotiated for zero-byte header compression as explained hereinabove.

Mapping between DSCPs and the desired Per-Hop Behavior (PHB). In IP packet headers, PHBs are not indicated as such; instead Differentiated DSCP values are used. In a given network domain, there is a locally defined mapping between DSCP values and PHBs. Standardized PHBs recommend a DSCP mapping, but network operators may choose alternative mappings.

Signaling messages allowing the PDSN to ask if the RAN supports traffic which requires a certain type of treatment. Such query may include RSVP messages which enable the PDSN to perform admission control for specific traffic.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method of transferring data in a communication system, the computer including a processor and a storage medium, the method comprising:

receiving, at a network access node, a plurality of registration requests from a radio access network (RAN) node, wherein each registration request identifies a corresponding mobile node, wherein receiving the plurality of registration requests further comprises receiving a respective routing key with each registration request, wherein each respective routing key is generated by the RAN node and comprises a first field and a second field, wherein the first field identifies the respective corresponding mobile node, wherein the second field is reserved for indicating a tunnel identifier;

receiving a plurality of data packets, wherein each of the plurality of data packets is destined for a respective mobile node and corresponds to a respective data packet treatment;

establishing, by the processor, a plurality of tunnels with the RAN node for each respective mobile node, wherein each of the plurality of tunnels corresponds to a respective data packet treatment, wherein a number of the plurality of tunnels is independent of a number of air-interface links between the RAN node and the respective mobile node, wherein the establishing further comprises enabling the RAN node to reorder respective data packets in different tunnels, preventing the RAN from reordering respective data packets having identical tunnel identifiers and preventing the RAN from dropping respective data packets associated with at least one tunnel;

transmitting each of the plurality of data packets over a respective one of the plurality of tunnels according to the respective data packet treatment; and receiving a back-pressure message from the RAN node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data packets corresponding to the at least one tunnel based on the back-pressure message.

2. The method of claim 1, wherein the establishing further comprises indicating to the RAN node whether or not the respective data packets carried by the respective tunnel can be dropped.

3. The method of claim 1, wherein the establishing further comprises each of the plurality of tunnels having a different at least one tunnel attribute corresponding to a different one of the respective data packet treatments.

4. The method of claim 1, wherein the establishing is in response to the receiving of a respective one of the plurality of data packets having a respective data packet treatment.

5. The method of claim 1, wherein the number of the plurality of tunnels is greater than the number of the air-interface links.

6. The method of claim 1, wherein each respective data packet treatment comprises signaling information comprising at least one of a Differentiated Service Code Point (DSCP) marking, or Service Level Agreement (SLA) information, or Resource ReSerVation Protocol (RSVP) information.

7. The method of claim 6, wherein establishing further comprises translating each respective signaling information into a respective code point value understood by the RAN node.

8. The method of claim 1, wherein the routing key further comprises a variable set by the RAN node to variably allocate resources between a plurality of mobile nodes and a respective plurality of tunnels.

9. The method of claim 8, wherein the variable set by the RAN node to variably allocate resources is based on at least one of historical usage of mobile nodes, or available data services.

10. The method of claim 8, wherein the variable comprises a field length of the routing key or a variable alternate field.

11. The method of claim 8, wherein the variable comprises the first field and the second field each having a variable field length.

12. The method of claim 8, wherein establishing the plurality of tunnels with the RAN node for each respective mobile node further comprises generating a tunnel identifier according to the second field.

13. The method of claim 1, wherein receiving the plurality of registration requests further comprises receiving a respective Generic Routing Encapsulation (GRE) key with each registration request, wherein each GRE key is generated by the RAN node and comprises a packet service identifier (PSI) field and a tunnel identifier (MTID) field, wherein the PSI field identifies the respective corresponding mobile node, and wherein the MTID field identifies a value corresponding to an available number of tunnels that may be established.

14. The method of claim 13, wherein establishing the plurality of tunnels with the RAN node for each respective mobile node further comprises generating a tunnel identifier corresponding to one of the available number of tunnels.

15. The method of claim 13, wherein receiving the plurality of registration requests further comprises receiving a respective GRE header comprising the GRE key and a sequence number corresponding to a sequence space, wherein each of the plurality of tunnels have different respective sequence spaces.

16. The method of claim 1, wherein each respective data packet treatment comprises signaling information comprising at least one of a Differentiated Service Code Point (DSCP) marking, or Service Level Agreement (SLA) information, or Resource ReSerVation Protocol (RSVP) information, wherein establishing further comprises translating each respective signaling information into a respective code point value understood by the RAN node, wherein the back-pressure message is based on a respective code point corresponding to the respective one of the plurality of tunnels.

17. At least one processor configured to transfer data in a communication system, comprising:
 a first module for receiving, at a network access node, a plurality of registration requests from a radio access network (RAN) node, wherein each registration request identifies a corresponding mobile node, wherein receiving the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;
 a second module for receiving a plurality of data packets, wherein each of the plurality of data packets is destined for a respective mobile node and corresponds to a respective data packet treatment;
 a third module for establishing a plurality of tunnels with the RAN node for each respective mobile node, wherein each of the plurality of tunnels corresponds to a respective data packet treatment, wherein a number of the plurality of tunnels is independent of a number of air-interface links between the RAN node and the respective mobile node, wherein the establishing further comprises enabling the RAN node to reorder respective data packets in different tunnels, preventing the RAN from reordering respective data packets having identical tunnel identifiers and preventing the RAN from dropping respective data packets associated with at least one tunnel;
 a fourth module for transmitting each of the plurality of data packets over a respective one of the plurality of tunnels according to the respective data packet treatment; and
 a fifth module for receiving a back-pressure message from the RAN node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data rackets corresponding to the at least one tunnel based on the back-pressure message.

18. A computer readable medium encoded with a computer program configured to transfer data in a communication system, comprising:
 at least one computer-readable instruction operable to cause a computer to receive, at a network access node, a plurality of registration requests from a radio access network (RAN) node, wherein each registration request identifies a corresponding mobile node, wherein receiving the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;
 at least one computer-readable instruction operable to cause the computer to receive a plurality of data packets, wherein each of the plurality of data packets is destined for a respective mobile node and corresponds to a respective data packet treatment;
 at least one computer-readable instruction operable to cause the computer to establish a plurality of tunnels with the RAN node for each respective mobile node, wherein each of the plurality of tunnels corresponds to a respective data packet treatment, wherein a number of the plurality of tunnels is independent of a number of air-interface links between the RAN node and the respective mobile node, wherein the establishing further comprises enabling the RAN node to reorder respective data packets in different tunnels, preventing the RAN from reordering respective data packets having identical tunnel identifiers and preventing the RAN from dropping respective data rackets associated with at least one tunnel;
 at least one computer-readable instruction operable to cause the computer to transmit each of the plurality of data packets over a respective one of the plurality of tunnels according to the respective data packet treatment; and
 at least one computer-readable instruction operable to cause the computer to receive a back-pressure message from the RAN node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data packets corresponding to the at least one tunnel based on the back-pressure message.

19. An apparatus configured to transfer data in a communication system, comprising:
 means for receiving, at a network access node, a plurality of registration requests from a radio access network (RAN) node, wherein each registration request identifies a corresponding mobile node, wherein receiving the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;
 means for receiving a plurality of data packets, wherein each of the plurality of data packets is destined for a respective mobile node and corresponds to a respective data packet treatment;
 means for establishing a plurality of tunnels with the RAN node for each respective mobile node, wherein each of the plurality of tunnels corresponds to a respective data packet treatment, wherein a number of the plurality of tunnels is independent of a number of air-interface links between the RAN node and the respective mobile node, wherein the establishing further comprises enabling the RAN node to reorder respective data packets in different tunnels, preventing the RAN from reordering respective data packets having identical tunnel identifiers and preventing the RAN from dropping respective data packets associated with at least one tunnel;

means for transmitting each of the plurality of data packets over a respective one of the plurality of tunnels according to the respective data packet treatment; and means for receiving a back-pressure message from the RAN node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data packets corresponding to the at least one tunnel based on the back-pressure message.

20. An apparatus configured to transfer data in a communication system, comprising:

a memory storage device comprising computer-readable instructions operable to:

receive, at a network access node, a plurality of registration requests from a radio access network (RAN) node, wherein each registration request identifies a corresponding mobile node, wherein receiving the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;

receive a plurality of data packets, wherein each of the plurality of data packets is destined for a respective mobile node and corresponds to a respective data packet treatment;

establish a plurality of tunnels with the RAN node for each respective mobile node, wherein each of the plurality of tunnels corresponds to a respective data packet treatment, wherein a number of the plurality of tunnels is independent of a number of air-interface links between the RAN node and the respective mobile node, wherein the establishing further comprises enabling the RAN node to reorder respective data packets in different tunnels, preventing the RAN from reordering respective data packets having identical tunnel identifiers and preventing the RAN from dropping respective data packets associated with at least one tunnel;

transmit each of the plurality of data packets over a respective one of the plurality of tunnels according to the respective data packet treatment; and receive a back-pressure message from the RAN node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data packets corresponding to the at least one tunnel based on the back-pressure message; and a processor adapted for executing the computer-readable instructions.

21. The apparatus of claim 20, wherein the computer-readable instructions to establish the plurality of tunnels further comprise computer-readable instructions to indicate to the RAN node whether or not the respective data packets carried by the respective tunnel can be dropped.

22. The apparatus of claim 20, wherein each of the plurality of tunnels comprises a different at least one tunnel attribute corresponding to a different one of the respective data packet treatments.

23. The apparatus of claim 20, wherein the computer-readable instructions to establish the plurality of tunnels further comprise computer-readable instructions responsive to receiving of a respective one of the plurality of data packets having a respective data packet treatment.

24. The apparatus of claim 20, wherein the number of the plurality of tunnels is greater than the number of the air-interface links.

25. The apparatus of claim 20 wherein each respective data packet treatment comprises signaling information comprising at least one of a Differentiated Service Code Point (DSCP) marking, or Service Level Agreement (SLA) information, or Resource ReSerVation Protocol (RSVP) information.

26. The apparatus of claim 25, wherein the computer-readable instructions to establish the plurality of tunnels further comprise computer-readable instructions to translate each respective signaling information into a respective code point value understood by the RAN node.

27. The apparatus of claim 20, wherein the routing key further comprises a variable set by the RAN node to variably allocate resources between a plurality of mobile nodes and a respective plurality of tunnels.

28. The apparatus of claim 27, wherein the variable set by the RAN node to variably allocate resources is based on at least one of historical usage of mobile nodes, or available data services.

29. The apparatus of claim 27, wherein the variable comprises a field length of the routing key or a variable alternate field.

30. The apparatus of claim 27, wherein the variable comprises the first field and the second field each having a variable field length.

31. The apparatus of claim 27, wherein the computer-readable instructions to establish the plurality of tunnels further comprise computer-readable instructions to generate a tunnel identifier according to the second field.

32. The apparatus of claim 20, wherein each of the plurality of registration requests further comprises a respective Generic Routing Encapsulation (GRE) key, wherein each GRE key is generated by the RAN node and comprises a packet service identifier (PSI) field and a tunnel identifier (MTID) field, wherein the PSI field identifies the respective corresponding mobile node, and wherein the MTID field identifies a value corresponding to an available number of tunnels that may be established.

33. The apparatus of claim 32, wherein the computer-readable instructions to establish the plurality of tunnels further comprise computer-readable instructions to generate a tunnel identifier corresponding to one of the available number of tunnels.

34. The apparatus of claim 32, wherein each of the plurality of registration requests further comprises a respective GRE header comprising the GRE key and a sequence number corresponding to a sequence space, wherein each of the plurality of tunnels have different respective sequence spaces.

35. The apparatus of claim 20, wherein each respective data packet treatment comprises signaling information comprising at least one of a Differentiated Service Code Point (DSCP) marking, or Service Level Agreement (SLA) information, or Resource ReSerVation Protocol (RSVP) information, wherein establishing further comprises translating each respective signaling information into a respective code point value understood by the RAN node, and wherein the back-pressure message is based on a respective code point corresponding to the respective one of the plurality of tunnels.

36. A computer-implemented method of transferring data in a communication system, the computer including a processor and a storage medium, the method comprising:

transmitting, by the processor, a plurality of registration requests from a radio access network (RAN) node to a network access node, wherein each registration request identifies a corresponding mobile node, wherein transmitting the plurality of registration requests further comprises transmitting a respective routing key with each registration request, wherein each respective routing key is generated by the RAN node and comprises a first field and a second field, wherein the first field identifies the respective corresponding mobile node, and wherein the second field is reserved for indicating a tunnel identifier;

receiving information from the network access node to establish a plurality of tunnels between the network access node and the RAN node for each respective mobile node, wherein each of the plurality of tunnels corresponds to a respective data packet treatment corresponding to a respective one of a plurality of data packets received by the network access node, wherein each of the plurality of data packets received by the network access node is destined for a respective mobile node and comprises a respective data packet treatment, wherein a number of the plurality of tunnels is independent of a number of the air-link interfaces between the RAN node and the respective mobile node;

receiving each of the plurality of data packets over a respective one of the plurality of tunnels according to the respective data packet treatment, wherein the receiving further comprises enabling the RAN node to reorder respective data packets in different tunnels, preventing the RAN from reordering respective data packets having identical tunnel identifiers and preventing the RAN from dropping respective data packers associated with at least one tunnel; and transmitting a back-pressure message to the network access node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data rackets corresponding to the at least one tunnel based on the back-pressure message.

37. The method of claim 36, further comprising forwarding each respective one of the plurality of data packets to the corresponding mobile node.

38. The method of claim 37, further comprising establishing the number of air-interface links between the RAN node and each respective mobile node, wherein the forwarding further comprises forwarding via a respective air-interface link.

39. The method of claim 36, wherein the receiving of the information to establish the plurality of tunnels further comprises receiving an indication as to whether or not the respective data packets carried by the respective tunnel can be dropped.

40. The method of claim 36, wherein each of the plurality of tunnels comprise a different at least one tunnel attribute corresponding to a different one of the respective data packet treatments.

41. The method of claim 36, wherein the receiving of the information to establish the plurality of tunnels further comprises a response to the network access node receiving of a respective one of the plurality of data packets having a respective data packet treatment.

42. The method of claim 36, wherein the number of the plurality of tunnels is greater than the number of the air-interface links.

43. The method of claim 36, wherein each respective data packet treatment comprises signaling information comprising at least one of a Differentiated Service Code Point (DSCP) marking, or Service Level Agreement (SLA) information, or Resource ReSerVation Protocol (RSVP) information.

44. The method of claim 43, wherein the receiving of the information to establish the plurality of tunnels further comprises receiving respective signaling information translated into respective code point values understood by the RAN node.

45. The method of claim 36, wherein the routing key further comprises a variable set by the RAN node to variably allocate resources between a plurality of mobile nodes and a respective plurality of tunnels.

46. The method of claim 45, wherein the variable is based on at least one of historical usage of mobile nodes, or available data services.

47. The method of claim 45, wherein the variable comprises a field length of the routing key or a variable alternate field.

48. The method of claim 45, wherein the variable comprises the first field and the second field each having a variable field length.

49. The method of claim 45, wherein the receiving of the information to establish the plurality of tunnels further comprises receiving a tunnel identifier according to the second field.

50. The method of claim 36, wherein transmitting the plurality of registration requests further comprises transmitting a respective Generic Routing Encapsulation (GRE) key with each registration request, wherein each GRE key is generated by the RAN node and comprises a packet service identifier (PSI) field and a tunnel identifier (MTID) field, wherein the PSI field identifies the respective corresponding mobile node, and wherein the MTID field identifies a value corresponding to an available number of tunnels that may be established.

51. The method of claim 50, wherein the receiving of the information to establish the plurality of tunnels further comprises receiving a tunnel identifier corresponding to one of the available number of tunnels.

52. The method of claim 50, wherein transmitting the plurality of registration requests further comprises transmitting a respective GRE header comprising the GRE key and a sequence number corresponding to a sequence space, wherein each of the plurality of tunnels have different respective sequence spaces.

53. The method of claim 36, wherein each respective data packet treatment comprises signaling information comprising at least one of a Differentiated Service Code Point (DSCP) marking, or Service Level Agreement (SLA) information, or Resource ReSerVation Protocol (RSVP) information, wherein the receiving of the information to establish the plurality of tunnels further comprises receiving respective signaling information translated into a respective code point value understood by the RAN node, and wherein the back-pressure message is based on a respective code point corresponding to the respective one of the plurality of tunnels.

54. At least one processor configured to transfer data in a communication system, comprising:
 a first module for transmitting a plurality of registration requests from a radio access network (RAN) node to a network access node, wherein each registration request identifies a corresponding mobile node, wherein transmitting the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;
 a second module for receiving information from the network access node to establish a plurality of tunnels between the network access node and the RAN node for each respective mobile node, wherein each of the plurality of tunnels corresponds to a respective data packet treatment corresponding to a respective one of a plurality of data packets received by the network access node, wherein each of the plurality of data packets received by the network access node is destined for a respective mobile node and comprises a respective data packet treatment, wherein a number of the plurality of tunnels is independent of a number of the air-link interfaces between the RAN node and the respective mobile node, wherein the receiving further comprises enabling the RAN node to reorder respective data packets in different tunnels, preventing the RAN from reordering respective data packets having identical tunnel identifiers and preventing the RAN from dropping respective data packets associated with at least one tunnel;
 a third module for receiving each of the plurality of data packets over a respective one of the plurality of tunnels according to the respective data packet treatment; and
 a fourth module for transmitting a back-pressure message to the network access node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data rackets corresponding to the at least one tunnel based on the back-pressure message.

55. A computer readable medium encoded with a computer program configured to transfer data in a communication system, comprising:
 at least one computer-readable instruction operable to cause a computer to transmit a plurality of registration requests from a radio access network (RAN) node to a network access node, wherein each registration request identifies a corresponding mobile node, wherein transmitting the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;
 at least one computer-readable instruction operable to cause the computer to receive information from the network access node to establish a plurality of tunnels between the network access node and the RAN node for each respective mobile node, wherein each of the plurality of tunnels corresponds to a respective data packet treatment corresponding to a respective one of a plurality of data packets received by the network access node, wherein each of the plurality of data packets received by the network access node is destined for a respective mobile node and comprises a respective data packet treatment, wherein a number of the plurality of tunnels is independent of a number of the air-link interfaces between the RAN node and the respective mobile node, wherein receiving the information further comprises enabling the RAN node to reorder respective data packets in different tunnels, preventing the RAN from reordering respective data packets having identical tunnel identifiers and preventing the RAN from dropping respective data packets associated with at least one tunnel;
 at least one computer-readable instruction operable to cause the computer to receive each of the plurality of data packets over a respective one of the plurality of tunnels according to the respective data packet treatment; and
 at least one computer-readable instruction operable to cause the computer to transmit a back-pressure message to the network access node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID) matches an identifier for the at least one tunnel in which the RAN is prevented from dropping respective data packets, then only the network access node can drop data packets corresponding to the at least one tunnel based on the back-pressure message.

56. An apparatus configured to transfer data in a communication system, comprising:
 means for transmitting a plurality of registration requests from a radio access network (RAN) node to a network access node, wherein each registration request identifies a corresponding mobile node, wherein transmitting the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;
 means for receiving information from the network access node to establish a plurality of tunnels between the network access node and the RAN node for each respective mobile node, wherein each of the plurality of tunnels corresponds to a respective data packet treatment corresponding to a respective one of a plurality of data packets received by the network access node, wherein each of the plurality of data packets received by the network access node is destined for a respective mobile node and comprises a respective data packet treatment, wherein a number of the plurality of tunnels is independent of a number of the air-link interfaces between the RAN node and the respective mobile node, wherein receiving the information further comprises enabling the RAN node to reorder respective data packets in different tunnels, preventing the RAN from reordering respective data packets having identical tunnel identifiers and preventing the RAN from dropping respective data packets associated with at least one tunnel;

means for receiving each of the plurality of data packets over a respective one of the plurality of tunnels according to the respective data packet treatment; and means for transmitting a back-pressure message to the network access node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data packets corresponding to the at least one tunnel based on the back-pressure message.

57. An apparatus configured to transfer data in a communication system, comprising:

a memory storage device comprising computer-readable instructions operable to:

transmit a plurality of registration requests from a radio access network (RAN) node to a network access node, wherein each registration request identifies a corresponding mobile node, wherein transmitting the plurality of registration requests further comprises receiving a respective routing key with each registration request, wherein each respective routing key is generated by the RAN node and comprises a first field and a second field, wherein the first field identifies the respective corresponding mobile node, and wherein the second field is reserved for indicating a tunnel identifier;

receive information from the network access node to establish a plurality of tunnels between the network access node and the RAN node for each respective mobile node, wherein each of the plurality of tunnels corresponds to a respective data packet treatment corresponding to a respective one of a plurality of data packets received by the network access node, wherein each of the plurality of data packets received by the network access node is destined for a respective mobile node and comprises a respective data packet treatment, wherein a number of the plurality of tunnels is independent of a number of the air-link interfaces between the RAN node and the respective mobile node, wherein receiving the information further comprises enabling the RAN node to reorder respective data packets in different tunnels, preventing the RAN from reordering respective data packets having identical tunnel identifiers and preventing the RAN from dropping respective data packets associated with at least one tunnel;

receive each of the plurality of data packets over a respective one of the plurality of tunnels according to the respective data packet treatment; and transmit a back-pressure message to the network access node, wherein the back-pressure message corresponds to a respective one of the plurality of tunnels and specifies a Packet Session Identifier (PSI), Differentiated Services Code Point (DSCP), and Micro-Tunnel Identifier (MTID) triplet, wherein if the MTID matches an identifier for the at least one tunnel in which the RAN is prevented from dropping respective data packets, then only the network access node can drop data packets corresponding to the at least one tunnel based on the back-pressure message; and a processor adapted for executing the computer-readable instructions.

58. The apparatus of claim 57, further comprising computer-readable instructions operable to forward each respective one of the plurality of data packets to the corresponding mobile node.

59. The apparatus of claim 58, further comprising computer-readable instructions operable to establish the number of air-interface links between the RAN node and each respective mobile node, wherein the forwarding further comprises forwarding via a respective air-interface link.

60. The apparatus of claim 57, wherein the computer-readable instructions operable to receive the information to establish the plurality of tunnels further comprise computer-readable instructions operable to receive an indication as to whether or not the respective data packets carried by the respective tunnel can be dropped.

61. The apparatus of claim 57, wherein each of the plurality of tunnels comprise a different at least one tunnel attribute corresponding to a different one of the respective data packet treatments.

62. The apparatus of claim 57, wherein the information to establish the plurality of tunnels is received in response to the network access node receiving a respective one of the plurality of data packets having a respective data packet treatment.

63. The apparatus of claim 57, wherein the number of the plurality of tunnels is greater than the number of air-interface links.

64. The apparatus of claim 57, wherein each respective data packet treatment comprises signaling information comprising at least one of a Differentiated Service Code Point (DSCP) marking, or Service Level Agreement (SLA) information, or Resource ReSerVation Protocol (RSVP) information.

65. The apparatus of claim 64, wherein the information to establish the plurality of tunnels further comprises respective signaling information translated into respective code point values understood by the RAN node.

66. The apparatus of claim 57, wherein the routing key further comprises a variable set by the RAN node to variably allocate resources between a plurality of mobile nodes and a respective plurality of tunnels.

67. The apparatus of claim 66, wherein the variable is based on at least one of historical usage of mobile nodes, or available data services.

68. The apparatus of claim 66, wherein the variable comprises a field length of the routing key or a variable alternate field.

69. The apparatus of claim 66, wherein the variable comprises the first field and the second field each having a variable field length.

70. The apparatus of claim 66, wherein the receiving of the information to establish the plurality of tunnels further comprises receiving a tunnel identifier according to the second field.

71. The apparatus of claim 57, wherein each of the plurality of registration requests further comprises a respective Generic Routing Encapsulation (GRE) key, wherein each GRE key is generated by the RAN node and comprises a packet service identifier (PSI) field and a tunnel identifier (MTID) field, wherein the PSI field identifies and the respective corresponding mobile node, and wherein the MTID field identifies a value corresponding to an available number of tunnels that may be established.

72. The apparatus of claim 71, wherein the information to establish the plurality of tunnels further comprises a tunnel identifier corresponding to one of the available number of tunnels.

73. The apparatus of claim 71, wherein each of the plurality of registration requests further comprises a respective GRE header comprising the GRE key and a sequence number corresponding to a sequence space, wherein each of the plurality of tunnels have different respective sequence spaces.

74. The apparatus of claim 57, wherein each respective data packet treatment comprises signaling information comprising at least one of a Differentiated Service Code Point (DSCP) marking, or Service Level Agreement (SLA) information, or Resource ReSerVation Protocol (RSVP) information, wherein the information to establish the plurality of tunnels further comprises respective signaling information translated into a respective code point value understood by the RAN node, and wherein the back-pressure message is based on a respective code point corresponding to the respective one of the plurality of tunnels.

* * * * *